United States Patent [19]

Yamanaka et al.

[11] Patent Number: 5,686,177
[45] Date of Patent: Nov. 11, 1997

[54] MAGNETIC RECORDING MEDIUM

[75] Inventors: Kazusuke Yamanaka, Kanagawa-ken; Hideo Kusada, Ibaraki-ken; Toyoji Okuwaki, Tokyo, all of Japan

[73] Assignee: Hitachi, Ltd., Tokyo, Japan

[21] Appl. No.: 290,259

[22] Filed: Aug. 15, 1994

[30] Foreign Application Priority Data

Aug. 20, 1993 [JP] Japan ................................ 5-206149

[51] Int. Cl.$^6$ ........................... G11B 5/66; G11B 21/00; H01F 10/16
[52] U.S. Cl. ............. 428/332; 428/694 T; 428/694 TM; 360/110
[58] Field of Search ................. 428/694 T, 694 TM, 428/694 TS, 332, 65.3; 204/192.2; 360/110

[56] References Cited

U.S. PATENT DOCUMENTS

| | | | |
|---|---|---|---|
| 4,511,635 | 4/1985 | Nagao et al. | 428/694 TM |
| 4,520,076 | 5/1985 | Saito et al. | 428/694 TM |
| 4,521,481 | 6/1985 | Nagao et al. | 428/336 |
| 4,663,193 | 5/1987 | Endo et al. | 427/129 |
| 5,370,928 | 12/1994 | Funabashi et al. | 428/336 |

FOREIGN PATENT DOCUMENTS

| | | |
|---|---|---|
| 415335A2 | 3/1991 | European Pat. Off. . |
| 488377A2 | 6/1992 | European Pat. Off. . |
| 530379A1 | 3/1993 | European Pat. Off. . |

OTHER PUBLICATIONS

Journal of Physics, F Metal Physics, vol. 14, pp. L155–L159 (1984) no month.

Journal of Magnetism and Magnetic Materials, vol. 127, pp. 233–240 (1993) no month.

*Primary Examiner*—John J. Zimmerman
*Assistant Examiner*—Michael LaVilla
*Attorney, Agent, or Firm*—Kenyon & Kenyon

[57] ABSTRACT

A magnetic recording medium having an improved S/N is provided by using a ferromagnetic metal thin film having a mean value of a fluctuation field of magnetic viscosithy measured at 25° C. in a region in which an applied magnetic field strength is 0.8 to 1.2 times as large as a remanence coercivity, of between 15 Oersteads and 30 Oersteads, and preferably a coercivity of between 700 Oersteads and 2000 Oersteads.

8 Claims, 2 Drawing Sheets

MAGNETIC RECORDING MEDIUM

BACKGROUND OF THE INVENTION

The present invention relates to a ferromagnetic metal thin film magnetic recording medium and a magnetic recording and reproducing apparatus, and more particularly to a magnetic recording medium having an excellent electromagnetic transducing property and a bulk magnetic recording and reproducing apparatus.

The fineness of magnetic particles in a coating type medium and crystal grains in a thin film medium is essential to improve a recording density and attain a high output power and low noise in a magnetic recording medium. For example, in a medium which uses iron particles studied in the past, the fineness has been increased such that a high performance tape such as Hi-8 which uses fine particles having a cylinder major axis length of approximately 0.2 μm and an cylinder diameter of approximately 0.03 μm is presently put into practice.

Even if the magnetic particles or the crystal grains of the magnetic medium are fine, a plurality of particles or grains may have the magnetization thereof reversed in group when the magnetic particles are in a clustered agglomerate or an interaction among the crystal grains is strong. When a unit of magnetization reversal increases as a plurality of particles or grains have the magnetization thereof reversed in group, a noise in a reproducing mode increases. This is a serious barrier to high density recording.

The size of the unit of magnetization reversal relates to a magnetic viscosity. Namely, it has been considered that the larger a fluctuation field is, the smaller is the unit of magnetization reversal.

The definition and a measuring method of the fluctuation field of the magnetic viscosity are described in Journal of Physics, F Metal Physics, Vol.14, pages L155–L159 (1984).

More detailed measurement method is disclosed in Journal of Magneticism and Magnetic Material, Vol. 127, pages 233–240 (1993).

SUMMARY OF THE INVENTION

It is an object of the present invention to provide a magnetic recording medium and a magnetic recording and reproducing apparatus which reduce a noise in the reproducing mode and which are suitable for high density recording.

In order to solve the above problems, the present invention aims to minimize the unit of magnetization reversal as much as possible. As a reference to determine the size of the unit of magnetization reversal, the fluctuation field of the magnetic viscosity is used. It has been found that a ferromagnetic thin film having a mean fluctuation field the magnetic viscosity of 15 Oersteads to 30 Oersteads at 25° C. in a region of an applied magnetic field strength which is 0.8 to 1.2 times as large as a remanence coercivity, and having a coercivity of 700 Oersteads to 2000 Oersteads, with a thickness of the magnetic film being 0.1 μm to 0.18 μm, can significantly reduce a noise level. It has also been found that preferable ferromagnetic thin films are those containing cobalt such as Co—O, Co—Ni, Co—Cr, Co—Mo, Co—Ta, Co—Ni—Cr or Co—Ni—O.

Since the magnetic recording medium of the present invention can reduce the cluster size in the magnetization reversal, a noise level can be lowered and an S/N ratio can be raised. By combining it with a magnetic head which uses a metal magnetic film as a portion of a magnetic pole, an to significantly improved recording characteristic of the medium is derived and a bulk recording and reproducing apparatus may be provided.

DESCRIPTION OF THE PREFERRED EMBODIMENTS

Figure 1:
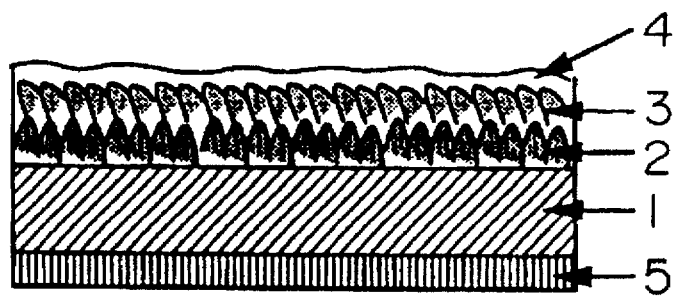
FIG. 1 shows a sectional view of a magnetic recording medium in accordance with one embodiment of the present invention.

Referring to the accompanying drawings, the present invention is explained. FIG. 1 shows an enlarged sectional view of a magnetic recording medium of the present invention. In FIG. 1, numeral 1 denotes a polymer film such as polyethylene terephthalate, polyethylene-2, 6-naphthalate, polyether ether ketone, polyphenylene sulfide or polyether sulfonamide, with a surface having fine particles homogeneously dispersed and coated or dispersed and coated in a discontinuous film arranged thereon as required. Numerals 2 and 3 denote a cobalt-based ferromagnetic thin film such as Co—O, Co—Ni, Co—Cr, Co—Mo, Co—Ta, Co—Ni—Cr or Co—Ni—O. In the present embodiment, it is a two-layer structure of the magnetic layers 2 and 3. Numeral 4 denotes a protective lubricant layer which may be a carbon film, a metal oxide film, a plasma polymerized film, fatty acid, perfluorocarbon carboxylic acid or perfluoropolyether. Numeral 5 denotes a back-coated layer having resin and filler mixedly dispersed. The magnetic layer 2 is preferably a ferromagnetic thin film which exhibits a mean fluctuation field at 25° C. of 15 Oersteads to 30 Oersteads in a region in which an applied magnetic field strength is 0.8 to 1.2 times as large as a remanence coercivity, and a coercivity of 700 Oersteads to 2000 Oersteads with an overall thickness of the magnetic layer being 0.1 μm to 0.18 μm. It is also preferable that the ferromagnetic thin film is a cobalt based magnetic alloy thin film which contains at least one element selected from a group consisting of O, Ni, Cr, Mo, V, Ti, Zr, Pt, Hf and Si.

In the present embodiment, the magnetic tape is discussed although the present invention is effective to other magnetic recording material such as a magnetic disk. A prior art medium will be described as a comparative example and examples of the present invention will also be described.

[Comparative Example]

A ferromagnetic thin film was formed on a polyethylene terephthalate film in a prior art method. Co—Ni (Ni content: 20% by weight) was obliquely evaporated on a polyethylene terephthalate film having a thickness of 10 μm in vacuum containing a small amount of oxygen to form a magnetic layer of acicular fine particles consisting of Co—Ni—O. An oxygen flow rate was 300 cc/min. Thicknesses of the magnetic films were 0.1 μm (tape A), 0.14 μm (tape B) and 0.18 μm (tape C). Coercivities measured while a magnetic field was applied longitudinally of the tapes were 1000 Oersteads, 1300 Oersteads and 1350 Oersteads, respectively. Fluctuation fields of magnetic viscosity of those tapes were measured at 25° C. with a magnetic field application time of 0 to 30 minutes. Mean values of the fluctuation field in a region in which an applied magnetic field strength was 0.8 to 1.2 times as large as a remanence coercivity were 14 Oersteads for the tape A, 12 Oersteads for the tape B and 10 Oersteads for the tape C. S/N when recorded at 7 MHz were +0.2 dB for the tape B and +0.1 dB for the tape C assuming that it was 0 dB for the tape A.

[EXAMPLE 1]

In the present example, the magnetic layer is of single or double layer structure having a total thickness of 0.1 μm. For the double layer structure, a very thin non-magnetic oxide layer was interposed between the magnetic layers. Like the comparative example, Co—Ni (Ni content: 20% by weight) was obliquely evaporated on a polyethylene terephthalate film in vacuum containing a small amount of oxygen to form a magnetic layer of acicular fine particles primarily consisting of Co—Ni—O. The oxygen flow rate was changed from 100 cc/min to 500 cc/min and the temperature of the polyethylene terephthalate film base during the evaporation was changed from 5° C. to 50° C. to form 30 tapes in total. Of those, ten were of single magnetic layer structure and the remaining twenty were of double layer structure of magnetic layers of 0.05 μm thickness with a non-magnetic oxide layer being interposed. The coercivities of the ten tapes of the single magnetic layer structure distributed from 950 Oersteads to 1650 Oersteads. The mean values of the fluctuation field (measured at 25° C.) in the region in which the applied magnetic field strength was 0.8 to 1.2 times as large as the remanence coercivity distributed from 10.5 Oersteads to 14.8 Oersteads. The S/N ratios recorded at 7 MHz distributed from −2.3 dB to +0.3 dB assuming the S/N of the tape A of the comparative example was 0 dB. Thus, when the magnetic layer was of single layer structure, significant improvement of the S/N ratio was not attained even if the oxygen flow rate and the temperature of the polyethylene terephthalate film base were changed.

Figure 2:
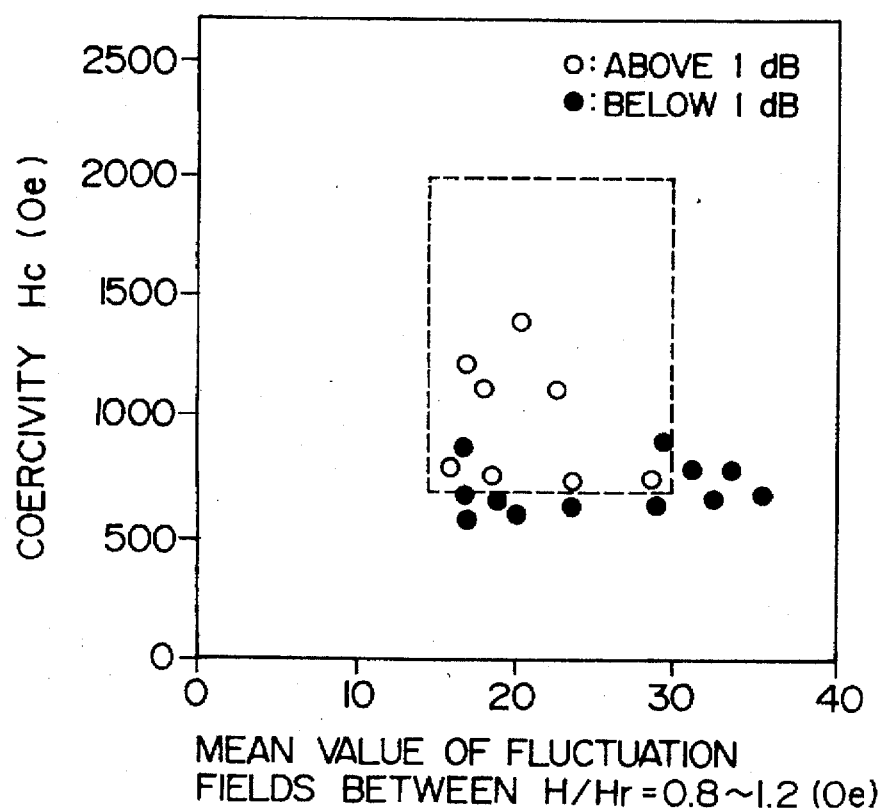
FIG. 2 shows a characteristic chart of a relationship between a coercivity and a fluctuation field, and an S/N ratio for a magnetic layer having a total film thickness of 0.01 μm.

On the other hand, the coercivities of the 20 tapes of the double layer structure of the magnetic layers of 0.05 μm thick with the interposed non-magnetic oxide layer distributed from 600 Oersteads to 1350 Oersteads. The mean values of the fluctuation fields measured at 25° C. in the region in which the applied magnetic field strength was 0.8 to 1.2 times as large as the remanence coercivity distributed from 16.6 Oersteads to 35.8 Oersteads. The S/N ratios in the recording at 7 MHz distributed from −3.2 dB to +1.8 dB assuming that the S/N of the tape A of the comparative example was 0 dB. Based on those data, assuming that the S/N of the tape A is 0 dB, the region which showed the improvement of S/N of no smaller than +1.0 dB is plotted in FIG. 2 with an ordinate representing a coercivity Hc and an abscissa representing a mean value of fluctuation field measured at 25° C. in the region in which the applied magnetic field H is 0.8 to 1.2 times as large as a remanence coercivity Hr. The measurement time of the magnetic viscosity was 0 to 30 minutes. In FIG. 2, white circles indicate the improvement of the S/N of no smaller than 1.0 dB over that of the tape A, and black dots indicate the improvement under 1.0 dB. As seen form FIG. 2, the S/N ratios are improved by no smaller than +1.0 dB when the coercivity is no smaller than 700 Oersteads and the mean value of the fluctuation field measured at 25° C. in the region in which the applied magnetic field is 0.8 to 1.2 times as large as the remanence coercivity is no smaller than 15 Oersteads.

When the total film thickness was no larger than 0.08 μm, the improvement of the S/N of no smaller than +1.0 dB was not attained whether the magnetic layer was of single layer structure or double layer structure.

[EXAMPLE 2]

In the present example, the magnetic layer is of single or double layer structure having a total film thickness of 0.14 μm. For the double layer structure, a non-magnetic oxide was interposed between the magnetic layers. Like the comparative example, Co—Ni was obliquely evaporated on a polyethylene terephthalate film of 10 μm thick in vacuum containing a small amount of oxygen to form a magnetic layer of acicular fine particles primarily consisting of Co—Ni—O. The Ni content in the Co—Ni alloy was 13 to 25% by weight. Total of 40 tapes were manufactured while the oxygen flow rate was changed from 100 cc/min to 500 cc/min and the temperature of the polyethylene terephthalate film base during the evaporation was changed from 5° C. to 50° C. Of those, 20 magnetic layers were of single layer structure and the remaining 20 were of double layer structure of the magnetic layers of 0.07 μm thick with the interposed non-magnetic oxide layer. The coercivities of the 20 tapes of the single magnetic layer structure distributed from 940 Oersteads to 1830 Oersteads. The mean values of the fluctuation field measured at 25° C. in the region in which the applied magnetic field strength was 0.8 to 1.2 times as large as the remanence coercivity distributed from 8.4 Oersteads to 12.6 Oersteads. The S/N ratios when recorded at 7 MHz distributed from −1.8 dB to +0.4 dB assuming that the S/N of the tape A of the comparative example was 0 dB. Thus, for the magnetic layer of the single layer structure, the significant improvement of the S/N was not attained even if the oxygen flow rate and the temperature of the polyethylene terephthalate film base were changed.

Figure 3:
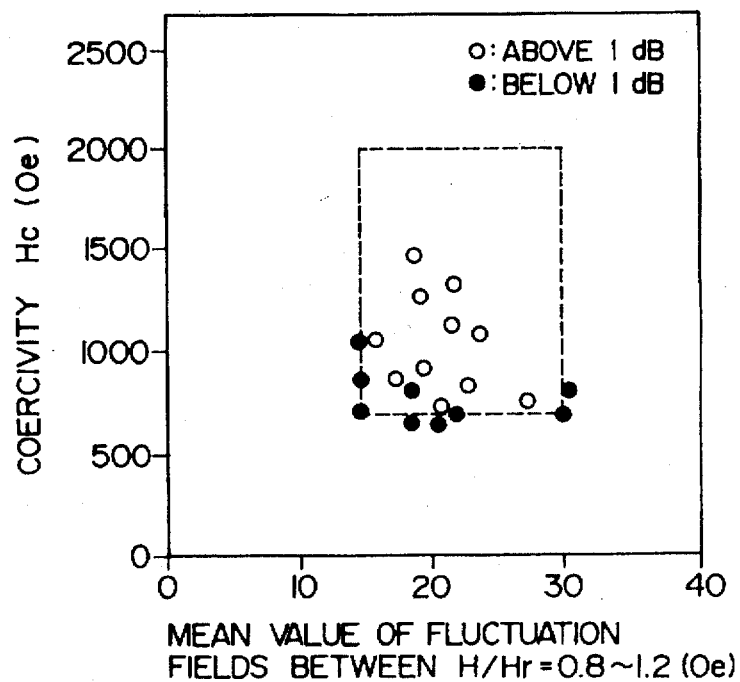
FIG. 3 shows a characteristic chart of a relationship between a coercivity and a fluctuation field and an S/N ratio for a magnetic layer having a total film thickness of 0.14 μm.

On the other hand, the coercivities of the 20 tapes of the double layer structure of the magnetic layer of 0.07 μm with the interposed non-magnetic oxide layer distributed from 680 Oersteads to 1470 Oersteads. The mean values of fluctuation field measured at 25° C. in region in which the applied magnetic field strength was 0.8 to 1.2 times as large as the remanence coercivity distributed from 14.6 Oersteads to 30.4 Oersteads. Further, the S/N ratios when recorded at 7 MHz distributed from −1.4 dB to +2.1 dB assuming that the S/N of the tape A of the comparative example was 0 dB. Based on those data, assuming that the S/N of the tape A is 0 dB, the region in which the S/N was improved by no smaller than +1.0 dB is plotted in FIG. 3 with an ordinate representing a coercivity Hc and an abscissa representing a mean value of fluctuation field in the region in which the applied magnetic field strength is 0.8 to 1.2 times as large as the remanence coercivity Hr. As seen from FIG. 3, the S/N was improved by no smaller than +1.0 dB when the coercive force was no smaller than 700 Oersteads and the mean value of the fluctuation field measured at 25° C. in the region in which the applied magnetic field strength was 0.8 times as large as the remanence coercivity was between 15 Oersteads and 30 Oersteads.

[EXAMPLE 3]

In the present example, the magnetic layer is of single or double layer structure having a total film thickness of 0.18 μm. For the double layer structure, a non-magnetic oxide was interposed between the magnetic layers. Like the comparative example, Co—Ni was obliquely evaporated on a polyethylene terephthalate film of 10 μm thick in vacuum containing a small amount oxygen to form a magnetic layer of acicular fine particles primarily consisting of Co—Ni—O. The Ni content in the Co—Ni alloy was 13 to 25% by weight. Total of 40 tapes were manufactured while the oxygen flow rate was changed from 100 cc/min to 500 cc/min and the temperature of the polyethylene terephthalate film base during the evaporation was changed from 5° C. to 50° C. Of those, 20 magnetic layers were of single layer structure and the remaining 20 were of double layer structure of the magnetic layers of 0.09 μm thick with the interposed non-magnetic oxide layer. The coercivities of the 20 tapes of the single magnetic layer structure distributed from 980 Oersteads to 1860 Oersteads. The mean values of the fluctuation field measured at 25° C. in the region in which the applied magnetic field strength was 0.8 to 1.2 times as large as the remanence coercivity distributed from 7.3 Oersteads to 12.1 Oersteads. The S/N ratios when recorded at 7 MHz distributed from −2.1 dB to +0.2 dB assuming that the S/N of the tape A of the comparative example was 0 dB. Thus, for the magnetic layer of the single layer structure, the significant improvement of the S/N was not attained even if the oxygen flow rate and the temperature of the polyethylene terephthalate film base were changed.

Figure 4:
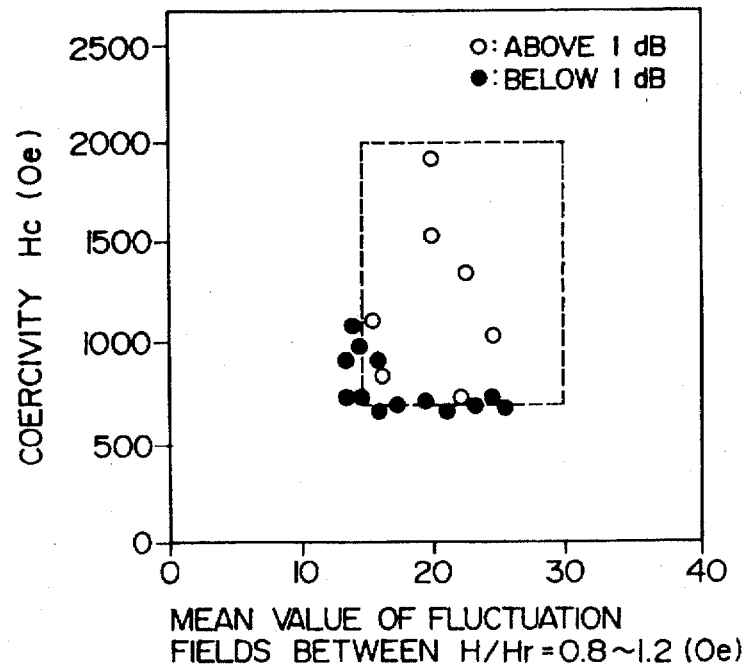
FIG. 4 shows a characteristic chart of a relationship between a coercivity and a fluctuation field, and an S/N ratio for a magnetic layer having a total film thickness of 0.18 μm.

On the other hand, the coercivities of the 20 tapes of the double layer stricture of the magnetic layer of 0.09 μm with the interposed non-magnetic oxide layer distributed from 690 Oersteads to 1860 Oersteads. The mean values of fluctuation field measured at 25° C. in the region in which the applied magnetic field strength was 0.8 to 1.2 times as large as the remanence coercivity distributed from 12.6 Oersteads to 26.1 Oersteads. Further, the S/N ratios when recorded at 7 MHz distributed from −1.0 dB to +1.2 dB assuming that the S/N of the tape A of the comparative example wads 0 dB. Based on those data, assuming that the S/n of the tape A is 0 dB, the region in which the S/N was improved by no smaller than +1.0 dB is plotted in FIG. 4 with an ordinate representing a coercivity Hc and an abscissa representing a mean value of fluctuation field in the region in which the applied magnetic field strength is 0.8 to 1.2 times as large as the remanence coercivity Hr. As seen from FIG. 4, the S/N was improved by no smaller than +1.0 dB when the coercive force was no smaller than 700 Oersteads and the mean value of the fluctuation field measured at 25° C. in the region in which the applied magnetic field strength was 0.8 times as large as the remanence coercivity was between 15 Oersteads and 30 Oersteads.

Further, when the mean value of fluctuation field was no smaller than 20 Oersteads, the improvement of over +1.5 dB was attained.

In the examples, the fluctuation field is the mean value measured at 25° C. in the region in which the applied magnetic field strength is 0.8 to 1.2 times as Furthermore, it is has been improved that the mean value of the fluctuation field, measured at 25° C., between the limits of 0.8 and 1.2 times the remanence coercivity is equal to the value of the fluctuation field measured at a magnetic field strength equal to the remanence coercivity.

When the total film thickness was no smaller than 0.18 μm, the improvement of S/N by no smaller than +1.0 dB was not attained whether the magnetic layer was of single layer structure or double layer structure.

In the examples, the Co—Ni alloy is used as the ferromagnetic thin film although it will be readily understood that the present invention is also effective when a thin film containing cobalt such as Co—O, Co—Cr, Co—Mo, Co—Ta, or Co—N—Cr is used. A similar effect is obtained when three or more magnetic layers are used.

In accordance with the present invention, when the ferromagnetic thin film is used as the magnetic layer, the coercivity thereof is selected to be no smaller than 700 Oersteads, and the mean value of the fluctuation field measured at 25° C. in the region in which the applied magnetic field strength is 0.8 to 1.2 times as large as the remanence coercivity is selected between 15 Oersteads and 30 Oersteads, the S/N of the medium can be significantly improved and the high density recording is attained.

What is claimed is:

1. A magnetic recording medium comprising:

a magnetic layer having at least one ferromagnetic cobalt-based thin film, the fluctuation field of said layer of a predetermined magnetic viscosity measured at 25° C. and at a magnetic field equal to a predetermined remanence coercivity being between 15 Oersteads and 30 Oersteads;

the magnetic layer having a coercivity of between 700 Oerstead and 2000 Oersteads; and the thickness of said magnetic layer being between 0.1 and 0.18 μm.

2. A magnetic recording medium according to claim 1 wherein said ferromagnetic thin film is a cobalt based thin film selected from Co—O, Co—Ni, Co—Cr, Co—Mo, Co—Ta, Co—Ni—Cr and Co—Ni—O.

3. A magnetic recording medium according to claim 1 wherein said magnetic recording medium comprises a magnetic tape.

4. A magnetic recording medium comprising:

a magnetic layer having at least one ferromagnetic cobalt-based thin film, the fluctuation field of said layer of a predetermined magnetic viscosity measured at 25° C. and at magnetic field equal to a predetermined remanence coercivity being between 20 Oersteads and 30 Oersteads;

the magnetic layer having a coercivity of between 700 Oerstead and 2000 Oersteads; and the thickness of said magnetic layer being between 0.1 and 0.18 μm.

5. A magnetic recording medium according to claim 4 wherein said ferromagnetic thin film is a cobalt based thin film selected from Co—O, Co—Ni, Co—Cr, Co—Mo, Co—Ta, Co—Ni—Cr and Co—Ni—O.

6. A magnetic recording medium according to claim 4 wherein said magnetic recording medium comprises a magnetic tape.

7. A magnetic recording apparatus comprising:

a magnetic head having a ferromagnetic thin film in a portion of a magnetic pole thereof; and a magnetic recording medium having a ferromagnetic cobalt-based thin film as a magnetic layer;

said thin film of said magnetic recording medium having a mean value of a fluctuation field of a predetermined magnetic viscosity at 25° C. and a magnetic field equal to a predetermined remanence coercivity which is between 15 Oersteads and 30 Oersteads;

said magnetic layer of said magnetic recording medium having a coercivity of between 700 Oersteads and 2,000 Oersteads; and said magnetic layer of said magnetic recording medium having a thickness of between 0.1 and 0.18 μm.

8. A magnetic recording apparatus comprising:

a magnetic head having a ferromagnetic thin film in a portion of a magnetic pole thereof; and a magnetic recording medium having a ferromagnetic cobalt-based thin film as a magnetic layer;

said thin film of said magnetic recording medium having a mean value of a fluctuation field of a predetermined magnetic viscosity at 25° C. and at an applied magnetic field equal to a predetermined remanence coercivity which is between 20 Oersteads and 30 Oersteads;

said magnetic layer of said magnetic recording medium having a coercivity of between 700 Oersteads and 2,000 Oersteads; and said magnetic layer of said magnetic recording medium having a thickness of between 0.1 and 0.18 µm.

* * * * *

UNITED STATES PATENT AND TRADEMARK OFFICE
CERTIFICATE OF CORRECTION

PATENT NO. : 5,686,177
DATED : November 11, 1997
INVENTOR(S) : Yazusuke Yamanaka et al It is certified that error appears in the above-identified patent and that said Letters Patent is hereby corrected as shown below:

IN THE TITLE PAGE: After "[73] Assignee: Hitachi, Ltd., Tokyo, Japan" add --Hitachi Maxwell, Ltd., Ibaraki-Ken, Japan--.

IN THE ABSTRACT, Line 3: Change "viscosithy" to --viscosity--.

| Column | Line | |
|---|---|---|
| 1 | 19 | Before "cylinder" change "an" to --a--. |
| 1 | 53 | After "field" insert --of--. |
| 1 | 67 | Change "an to" to --a--. |
| 2 | 53 | After "effective" change "to" to --with--. |
| 3 | 62 | Change "form" to --from--. |
| 4 | 40 | Before "region" insert --the--. |

UNITED STATES PATENT AND TRADEMARK OFFICE
CERTIFICATE OF CORRECTION

PATENT NO. : 5,686,177
DATED : 11 November 1997
INVENTOR(S) : Kazusuke YAMANAKA et al.

It is certified that error appears in the above-identified patent and that said Letters Patent is hereby corrected as shown below:

| Column | Line | |
|---|---|---|
| 5 | 24 | Change "stricture" to --structure--. |
| 5 | 33 | Change "wads" to --was--. |
| 5 | 34 | Change "S/n" to --S/N--. |
| 5 | 52 | Before "Furthermore" insert --the remanence coercivity.--. |
| 5 | 53 | Change "improved" to --proved--. |
| 6 | 20 | Change "Oerstead" to --Oersteads--. |
| 6 | 39 | Change "Oerstead" to --Oersteads--. |
| 6 | 56 | After "25° C. and" insert --at--. |

Signed and Sealed this

Tenth Day of November 1998

BRUCE LEHMAN

*Attest:*

*Attesting Officer*         Commissioner of Patents and Trademarks

UNITED STATES PATENT AND TRADEMARK OFFICE
CERTIFICATE OF CORRECTION

PATENT NO. : 5,686,177

DATED : 11 November 1997

INVENTOR(S) : Kazusuke YAMANAKA et al.

It is certified that error appears in the above-identified patent and that said Letters Patent is hereby corrected as shown below:

IN THE TITLE PAGE: After "[73] Assignee: Hitachi, Ltd., Tokyo, Japan" add

--Hitachi Maxell, Ltd., Ibaraki-shi, Japan--.

Signed and Sealed this

Third Day of August, 1999

Q. TODD DICKINSON

*Attest:*

*Attesting Officer*  *Acting Commissioner of Patents and Trademarks*